United States Patent
Van Hillo et al.

(10) Patent No.: US 8,277,294 B2
(45) Date of Patent: Oct. 2, 2012

(54) METHOD AND DEVICE FOR SLITTING A CHICKEN LEG

(75) Inventors: Eric Adriaan Van Hillo, Oostzaan (NL); Eric De Jong, Oostzaan (NL); Jan Willem Hagendoorn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/176,391

(22) Filed: Jul. 5, 2011

(65) Prior Publication Data
US 2012/0178351 A1 Jul. 12, 2012

(30) Foreign Application Priority Data
Jul. 5, 2010 (NL) .................................. 2005027

(51) Int. Cl.
*A22C 18/00* (2006.01)
(52) U.S. Cl. ............................................. 452/148
(58) Field of Classification Search .............. 452/125, 452/127–130, 135, 138, 54, 153–155, 165, 452/187–189, 166–169, 185, 170
See application file for complete search history.

(56) References Cited

U.S. PATENT DOCUMENTS

| | | | |
|---|---|---|---|
| 5,228,881 A | 7/1993 | Sekiguichi | |
| 6,312,326 B1 * | 11/2001 | van den Nieuwelaar et al. | 452/120 |
| 7,004,830 B2 * | 2/2006 | van der Steen et al. | 452/185 |
| 7,232,365 B2 * | 6/2007 | Annema et al. | 452/167 |
| 7,530,888 B2 * | 5/2009 | Annema et al. | 452/167 |
| 7,614,941 B2 * | 11/2009 | van den Nieuwelaar et al. | 452/185 |
| 7,824,251 B2 * | 11/2010 | van den Nieuwelaar et al. | 452/185 |
| 2003/0181157 A1 | 9/2003 | Annema et al. | |

FOREIGN PATENT DOCUMENTS

| | | |
|---|---|---|
| EP | 0 594 934 A2 | 5/1994 |
| EP | 2 153 727 A1 | 2/2010 |
| JP | 2001-1490011 | 6/2001 |

OTHER PUBLICATIONS

Search report for NL 2005027, dated Mar. 1, 2011.

* cited by examiner

*Primary Examiner* — Richard Price, Jr.
(74) *Attorney, Agent, or Firm* — Dority & Manning, P.A.

(57) ABSTRACT

A method and device for slitting a chicken leg which is suspended at its ankle joints from a carrier that forms part of a train of carriers that are movable in a processing line that passes the device is provided. A positioning step is applied for placing the leg in a suitable position for cutting the leg. Subsequently in a stabbing step a knife is brought into engagement with the leg. The stabbing step is followed by a slitting step in which the knife is moved along the leg so as to provide a slit in the longitudinal direction of the leg in order to enable a subsequent deboning step of the leg. In the positioning step a first pressing organ engages the leg in the vicinity of the knee joint so as to press the leg against a movable supporting surface for the leg that is positioned opposite to the pressing organ. A second pressing organ engages the leg from the side so as to push the leg into a substantially straight orientation of the drum and the thigh with respect to each other.

7 Claims, 5 Drawing Sheets

METHOD AND DEVICE FOR SLITTING A CHICKEN LEG

FIELD OF THE INVENTION

The present invention relates to a method and a device for slitting a chicken leg suspended at its ankle joints from a carrier that forms part of a train of carriers that are movable in a processing line, which leg comprises a drum and a thigh that are connected to each other at a knee joint.

BACKGROUND OF THE INVENTION

A conventional method and device are known from the Japanese application 11-333894 in the name of Mayekawa Manufacturing Co. Ltd., published on Jun. 5, 2001 under number 2001-149001.

From this Japanese application a method is known that includes a positioning step for placing the leg in a suitable position for cutting the leg, and a subsequent stabbing step in which a knife is brought into engagement with the leg, which stabbing step is followed by a slitting step in which the knife is moved along the leg so as to provide a slit in the longitudinal direction of the leg in order to enable a subsequent deboning step of the leg.

This is arranged in the Japanese application by application of a processing device which has at least an upper pusher near to the ankle bone of the leg, and a lower pusher for pressing the hung chicken leg in an obliquely upward direction from below towards a curved inner side of a curved bone of the leg so as to secure a suitable position for cutting same. When the knife is subsequently brought into engagement with and moved along the leg so as to provide the intended slit in the longitudinal direction of the leg, a complicated game of pressurization and depressurization of the upper pusher and lower pusher is carried out so that pressing force of the bone against the knife is suitably changed when the knife is moved from the ankle to the knee joint, and thereafter from the knee joint further down along the thighbone. When passing the knee joint, the pressing force of the upper pusher and lower pusher even have to be cancelled altogether.

SUMMARY OF THE INVENTION

Aspects and advantages of the invention will be set forth in part in the following description, or may be obvious from the description, or may be learned through practice of the invention.

It is an object of the invention to provide a simpler alternative for the known method and device and provide a reliable cutting operation of the poultry leg or legs, wherein the occurrence of bone splinters is avoided and while allowing for a high rate of automated processing of such poultry legs that are supplied in a fast-moving processing line along such a processing device.

The method and the device of the invention are to that end characterized by one or more of the appended claims.

According to an exemplary embodiment of the invention, a device is embodied with a movable supporting surface for the leg and a first pressing organ and is arranged to engage the leg in the vicinity of the knee joint so as to press the leg against the movable supporting surface. This embodiment further comprises a second pressing organ that is arranged to engage the leg from the side so as to push the leg into a substantially straight orientation of the drum and the thigh with respect to each other.

This enables the operation according to an exemplary method of the invention in which, in the positioning step, the first pressing organ engages the leg in the vicinity of the knee joint so as to press the leg against the movable supporting surface for the leg that is positioned opposite to the pressing organ. The second pressing organ engages the leg from the side so as to push the leg into a substantially straight orientation of the drum and the thigh with respect to each other. By this arrangement it is possible to reliably provide an accurate slit by moving the knife along the bone of the leg from its ankle joint up to the thighbone at the far side of the knee joint.

In this exemplary method it is then possible that during the slitting step in which the knife is moved along the bone of the leg for providing the leg with a slit, the device of this exemplary embodiment of the invention is arranged such that the first pressing organ and the second pressing organ maintain the leg into its substantially straight orientation of the drum and the thigh with respect to each other.

A further beneficial feature of the method of the invention is that in the stabbing step the knife stabs into the flesh of the leg at a position that lies adjacent to the legs' bone. This effectively avoids the occurrence of bone splinters. This can be further promoted by arranging that during cutting the knife has its cutting edge positioned at a far side of the leg bone.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to a preferable embodiment of a device according to the invention and with reference to the drawing. A full and enabling disclosure of the present invention, including the best mode thereof, directed to one of ordinary skill in the art, is set forth in the specification, which makes reference to the appended figures, in which.

In the drawings.

Wherever in the figures the same reference numerals are applied these numerals refer to the same parts. The use of identical or similar reference numerals in different figures denotes identical or similar features.

DETAILED DESCRIPTION OF THE INVENTION

The present invention provides a method and a device for slitting a chicken leg suspended at its ankle joints from a carrier that forms part of a train of carriers that are movable in a processing line. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

It is noted that the figures show only those parts of the processing device of the invention and the processing line according to which the processing line's carriers are moved along the processing device that are required for a proper understanding of the invention. The parts that are not shown are completely obvious for the person skilled in the art and their being left out of the figures therefore does not deprive the person skilled in the art of its ability to carry out the invention.

Figure 1:
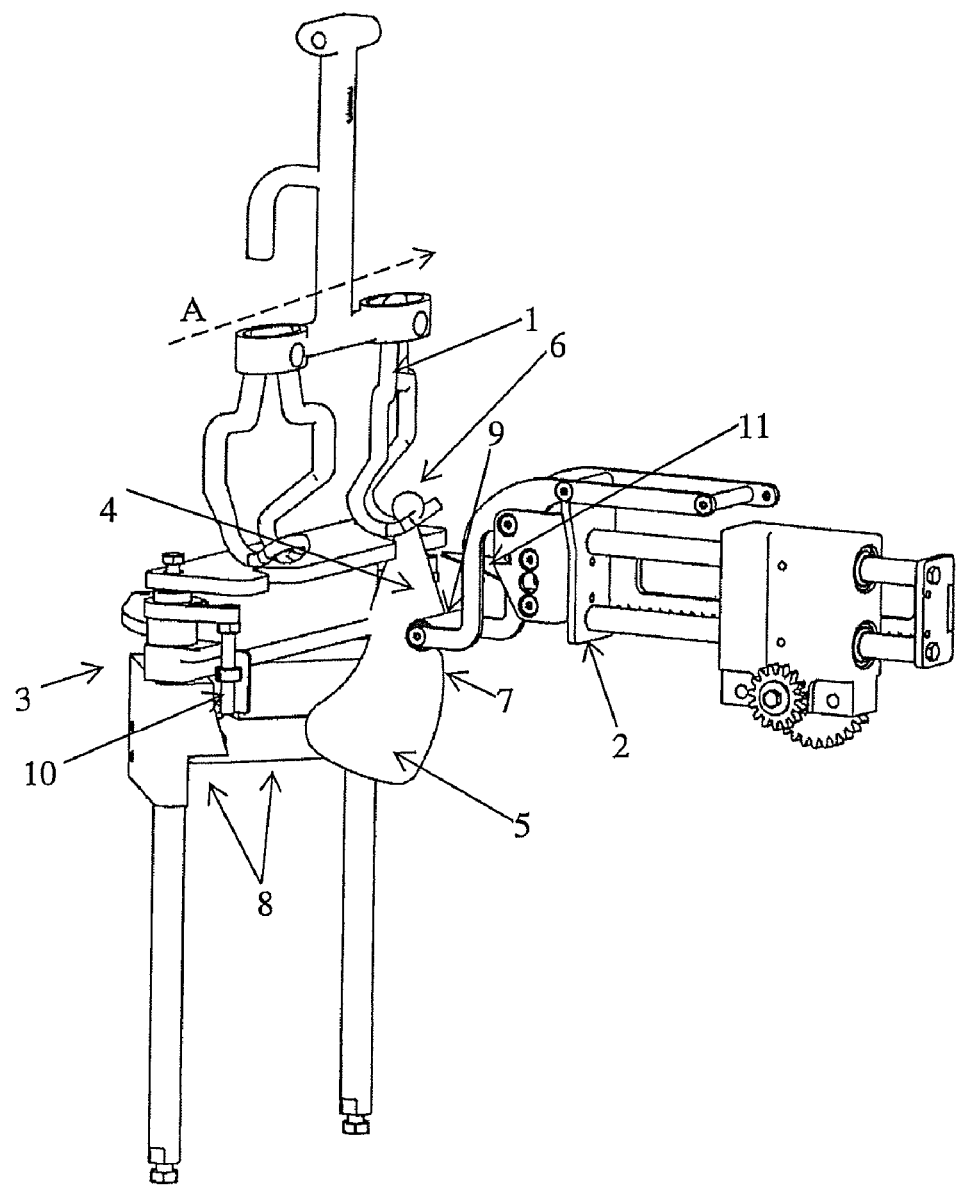
FIG. 1 shows an exemplary embodiment of the invention prior to its operating on a poultry leg suspended from a carrier.

With reference first to FIG. 1, a carrier 1 is shown that forms part of a train of carriers (not shown) that are movable in a processing line in the direction of arrow A along the processing device 2, 3 of the invention.

From the carrier 1, a chicken leg 4, 5 is suspended at its ankle joints 6. FIG. 1 merely shows a single chicken leg 4, 5, but it goes without saying that during normal operation the carrier 1 always carries two chicken legs that are suspended from the carrier 1 adjacent to each other. The chicken leg comprises a drum 4 and a thigh 5 that are connected to each other at a knee joint 7.

Figure 3:
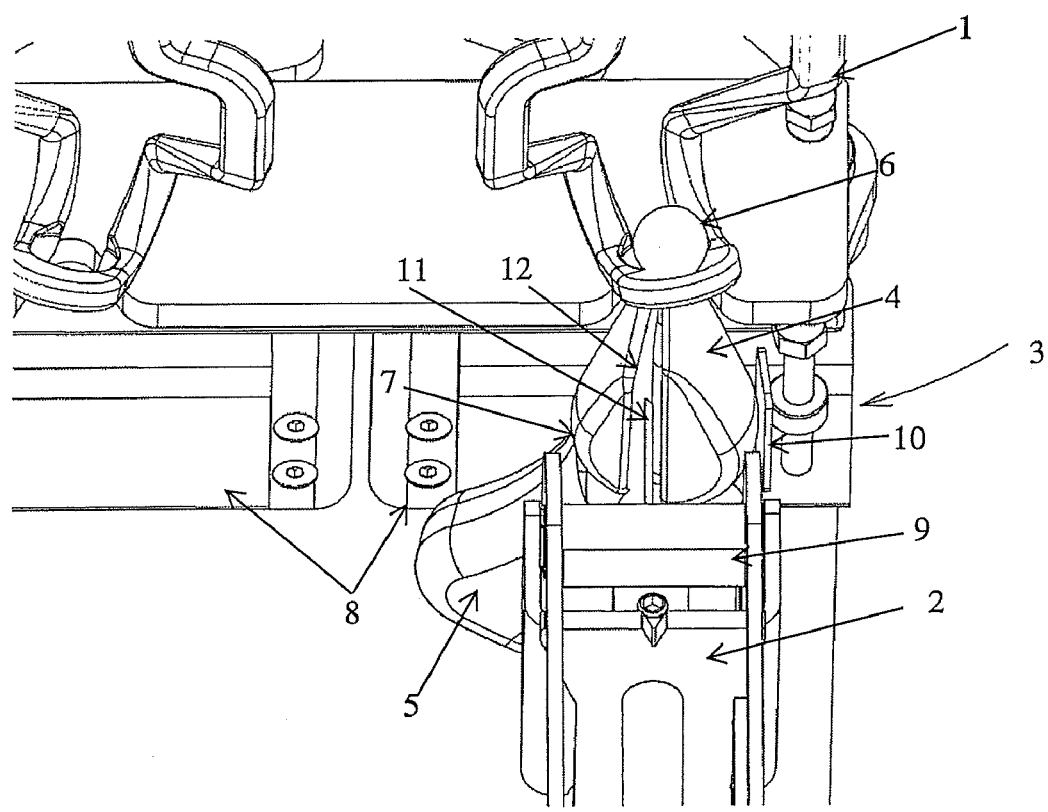

The processing device 2, 3 of the invention includes a movable supporting surface 8 for the leg 4, 5 and opposite thereto a first pressing organ 9 which is arranged to engage the leg 4, 5 in the vicinity of the knee joint 7 so as to press the leg 4, 5—which at a certain time is moved between the first pressing organ 9 and the movable supporting surface 8—against surface 8. The processing device 2, 3 further includes a second pressing organ 10 (clearly shown in FIG. 3) and which is arranged to subsequently engage the leg 4, 5 from the side so as to push the leg 4, 5 into a substantially straight orientation of the drum 4 and the thigh 5 with respect to each other.

Figure 2:
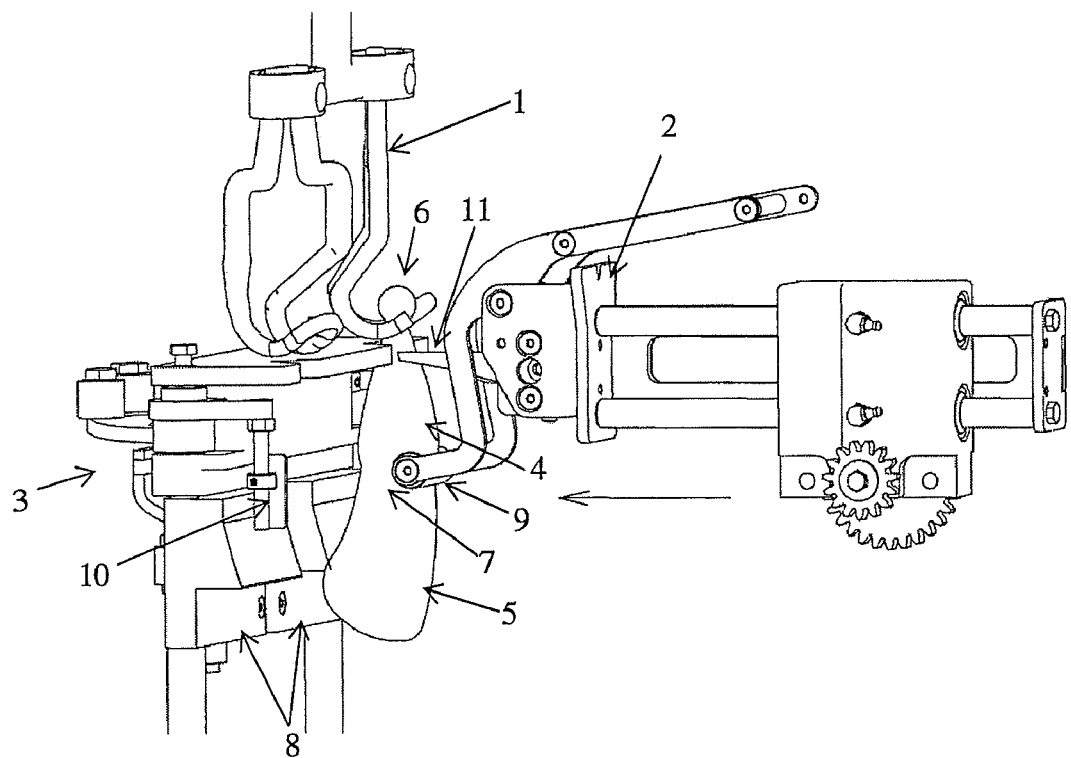
FIGS. 2-5 show an exemplary embodiment of the invention in a series of operations carried out in accordance with an exemplary method of the invention.

FIG. 2 shows the initial operation when the first pressing organ 9 engages the poultry leg 4, 5 in the vicinity of the knee joint 7 and presses the leg 4, 5 against the supporting surface 8. Due to the fact that this supporting surface 8 can slightly move backwards, the leg 4, 5 is moved into a suitable and slightly twisted position from which it can reliably be moved into its eventual position by the operation of the second pressing organ 10 (better shown in FIG. 3) which is arranged to engage the leg 4, 5 from the side and push it into a substantially straight orientation of the drum 4 and the thigh 5 with respect to each other.

FIG. 2 further shows that simultaneously with the engagement of the poultry leg 4, 5 by the first pressing organ 9, a knife 11 stabs into the flesh of the leg 4, 5. This is done preferably at a position that lies adjacent to the legs' bone.

Figure 4:
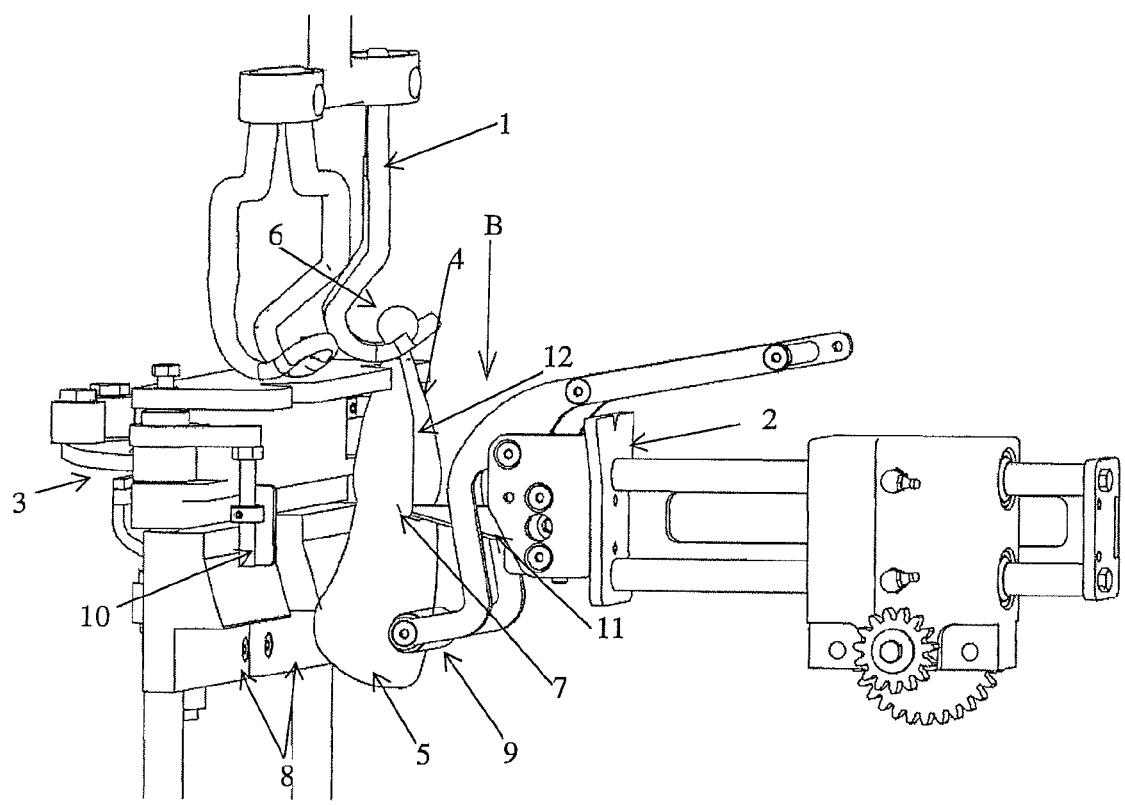

After the stabbing operation of the knife 11 is complete, the knife 11 is operated to move downwards according to arrow B shown in FIG. 4. By this movement a slitting step is executed in which the knife 11 is moved along the bone of the leg 4, 5 so as to provide a slit 12 in the longitudinal direction of the leg 4, 5. This enables a subsequent deboning step of the leg 4, 5.

Figure 5:
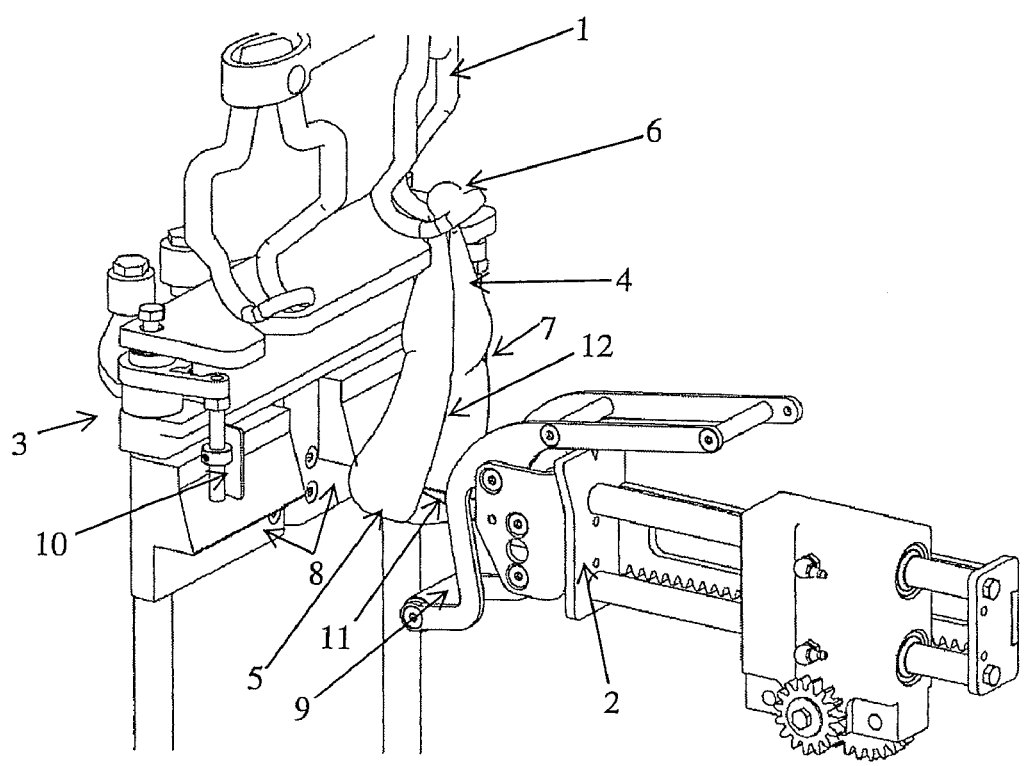

FIG. 5 finally shows the position of the relevant parts of the processing device 2, 3 of the invention with respect to each other when the making of the slit 12 is completed.

It is remarked that for the avoidance of bone splinters it is preferred that the knife 11 has its cutting edge positioned at a far side of the leg bone. While this is not clearly visible in the figures yet completely clear for the person skilled in the art.

It is further expressly pointed out that the above elucidation with reference to the drawing entails nothing but one of the possible embodiments of the processing device of the invention. The appended claims may therefore not be construed as to be limited by the specific construction as shown and discussed with reference to the drawing. The device and the method of its operation may be varied according to the circumstances without departing from the invention and the scope of protection as defined by the appended claims. More particularly, while the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A method for slitting a chicken leg that is suspended at its ankle joints from a carrier that forms part of a train of carriers that are movable in a processing line, the chicken leg comprising a drum and a thigh that are connected to each other at a knee joint, the method comprising:
    engaging the leg near the knee joint with a first pressing organ so as to press the leg against a movable supporting surface positioned opposite to the first pressing organ;
    contacting the leg from the side with a second pressing organ so as to push the leg into a substantially straight orientation of the drum and the thigh relative to each other;
    stabbing the leg with a knife; and,
    slitting the leg by moving a knife in the longitudinal direction of the leg to enable a subsequent deboning of the leg.

2. A method for slitting a chicken leg as in claim 1, further comprising the step of:
    using the first pressing organ and the second pressing organ to maintain the leg in the substantially straight orientation of the drum and thigh during said step of slitting.

3. A method for slitting a chicken leg as in claim 1, wherein during said step of stabbing the knife stabs into the leg at a position that lies adjacent to the bone of the leg.

4. A processing device for slitting a chicken leg, the chicken leg having a drum and a thigh that are connected to each other at a knee joint, the chicken leg suspended at an ankle joint from a carrier that forms part of a train of carriers that are movable in a processing line that passes the processing device, the processing device comprising:
    at least one positioning organ for placing the leg into a suitable position for cutting the leg, said positioning organ comprising
        a movable supporting surface for the leg;
        a first pressing organ arranged to engage the leg in the vicinity of the knee joint to press the leg against said movable supporting surface;
        a second pressing organ arranged to engage the leg from the side to push the leg into a substantially straight orientation of the drum and the thigh with respect to each other; and
    a knife that is arranged to be brought into engagement with the leg, said knife movable along the leg so as to provide a slit in the longitudinal direction of the leg in order to enable a subsequent deboning of the leg.

5. A processing device for slitting a chicken leg as in claim 4, wherein said first pressing organ and said second pressing organ are arranged to maintain the leg into the substantially straight orientation of the drum and the thigh with respect to each other when said knife is moved along a bone of the leg for providing the leg with a slit.

6. A processing device for slitting a chicken leg as in claim 4, wherein said knife is arranged to stab into the flesh of the leg at a position that lies adjacent to the bone of the leg.

7. A processing device for slitting a chicken leg as in claim 4, wherein said knife has a cutting edge positioned at a far side of the bone of the leg.

* * * * *